United States Patent
Wild et al.

(10) Patent No.: US 9,228,156 B2
(45) Date of Patent: Jan. 5, 2016

(54) PROCESS FOR THE PRODUCTION OF FATTY ACID ESTERS

(71) Applicant: Johnson Matthey Davy Technologies Limited, London (GB)

(72) Inventors: Robert Wild, Thornaby (GB); Rickard Umberto Andersson, London (GB)

(73) Assignee: Davy Process Technology Limited, London (GB)

( * ) Notice: Subject to any disclaimer, the term of this patent is extended or adjusted under 35 U.S.C. 154(b) by 0 days.

(21) Appl. No.: 14/407,862

(22) PCT Filed: May 23, 2013

(86) PCT No.: PCT/GB2013/051351
§ 371 (c)(1),
(2) Date: Dec. 12, 2014

(87) PCT Pub. No.: WO2013/186526
PCT Pub. Date: Dec. 19, 2013

(65) Prior Publication Data
US 2015/0152353 A1    Jun. 4, 2015

(30) Foreign Application Priority Data
Jun. 15, 2012 (GB) .................................. 1210655.5

(51) Int. Cl.
*C11C 3/00* (2006.01)
*C11C 1/00* (2006.01)

(52) U.S. Cl.
CPC . *C11C 3/003* (2013.01); *C11C 1/00* (2013.01); *Y02E 50/13* (2013.01)

(58) Field of Classification Search
None
See application file for complete search history.

(56) References Cited

U.S. PATENT DOCUMENTS

| 5,157,168 A | 10/1992 | Wilmott et al. |
| 5,536,856 A | 7/1996 | Harrison et al. |

FOREIGN PATENT DOCUMENTS

| CN | 101244857 | * 8/2008 | ................ C02F 1/58 |
| CN | 101318750 | * 12/2008 | ................ C01F 1/04 |
| EP | 2348009 A2 | 7/2011 | |
| WO | 2005021697 A1 | 3/2005 | |

OTHER PUBLICATIONS

CN 101244857, Dingliang Chen, Alkal deweighting wastewater processing method and device, 2008, English translation (14 pages).*
CN 101318750, Baixiong Dai, et al., Method for treating waste water from acetic acid mercapto-isoctyl ester, 2008, English translation (4 pages).*
International Search Report dated Sep. 5, 2013.

* cited by examiner

*Primary Examiner* — Yate K Cutliff
(74) *Attorney, Agent, or Firm* — Armstrong Teasdale LLP

(57) ABSTRACT

In a process for producing fatty acid esters, a fatty acid or fatty acid mixture is subjected to esterification with a lower alkanol in an esterification reactor maintained under esterification conditions to form a stream comprising the corresponding lower alkyl ester(s). An overhead stream comprising unreacted lower alkanol, water and a heavy organic content of one or more of lower alkyl ester and/or acids is recovered from the reactor. The overhead stream is subjected to distillation in a first distillation column to separate a portion of the lower alkanol from a stream comprising the water, the remaining lower alkanol and the heavy organic content. This stream is recovered and subjected to distillation in a second distillation column to provide an overhead stream comprising lower alkanol and at least a major portion of the heavy organic content and a water stream having a reduced heavy organic and alkanol content.

17 Claims, 2 Drawing Sheets

PROCESS FOR THE PRODUCTION OF FATTY ACID ESTERS

The present invention relates to a process for the production of fatty acid esters. More particularly, it relates to a process for the production of detergent fatty acid esters. In a further arrangement the present invention relates to a process for the production of fatty alcohols.

Fatty alcohols, or higher alcohols as they are sometimes designated, are monohydric aliphatic alcohols containing six or more carbon atoms which are derived either from natural sources or are synthesised from petroleum feedstocks. They are often classified by their market usage. As the primary end use of primary alcohols containing between about 6 and about 11 carbon atoms is the production of plasticiser esters, such alcohols are often termed plasticiser alcohols. For higher alcohols containing, for example, from about 11 up to about 20 carbon atoms, the major use is the production of synthetic detergents, hence such alcohols are often termed detergent alcohols. The distinction between plasticiser alcohols and detergent alcohols is somewhat arbitrary and detergent alcohols may have from 10 carbon atoms. In addition, there is some production of phthalate esters from a $C_{13}$ "oxo" alcohol and also some production of; for example, non-ionic surfactants from $C_8$ to $C_{10}$ alcohols.

Although there are some natural products which contain esters which can be hydrogenated to produce alcohols in the plasticiser range, these are more usually produced synthetically from petroleum feedstocks by, for example, the so-called "oxo" process, a process which is also termed oxonation or hydroformylation. Detergent range alcohols, on the other hand, are typically produced by hydrogenation of low molecular alkyl esters of fatty acids. Such esters can be produced by transesterification of natural triglycerides or by esterification of the fatty acids obtained by hydrolysis of the triglycerides. Examples of triglycerides which can be used as raw materials include natural oils, such as coconut oil, rape seed oil, and palm oils, and animal fats such as lard, tallow, and fish oils. As such natural raw materials contain mixtures of triglycerides, the alcohol products obtained upon hydrogenation are also mixtures of n-alkanols of differing molecular weight. Such mixtures of alkanols are acceptable for production of detergents without prior separation of the alkanols one from another.

One process for carrying out the esterification is described in U.S. Pat. No. 5,536,856 the contents of which are incorporated herein by reference. In this process, the esterification of the fatty acid is carried out in a column reactor having a plurality of esterification trays, each having a predetermined liquid hold-up and containing a charge of a solid esterification catalyst. The fatty acid flows down the column reactor against an upflowing lower alkyl alcohol vapour stream such as methanol. The supplied alcohol is relatively dry and water of esterification is removed from the top of the column in the vapour stream. The product ester is recovered from the sump of the reactor. As the liquid flows down the trays it encounters progressively drier alcohol which drives the ester reaction towards 100% conversion. The ester may then be fed to a polishing reactor operated under liquid phase conditions. Once produced, these esters can be utilised as biodiesel or they can be hydrogenated to the desired alcohols.

An alternative process for the production of fatty alcohols is described in U.S. Pat. No. 5,157,168. In this process the fatty alcohols are produced by hydrogenation of lower alkyl esters, particularly methyl esters, of fatty acids derived from natural triglycerides, under conditions which minimize formation of by-product alkanes and ethers. The hydrogenation is followed by refining of any resulting ester-containing hydrogenation product to produce a substantially ester free fatty alcohol.

Whatever process is used for the esterification an excess of alkanol is generally used. Since water is produced during the esterification reaction and it is desirable to separate the excess alkanol from the water generated in the esterification.

One prior art process for achieving this separation is illustrated schematically in FIG. 1. Fatty acid is fed in line 1 to the esterification reactor 2. In the reactor 2 the downflowing acid is reacted with upflowing alkanol which has been added to the reactor 2 in line 6. The ester product is removed from the reactor 2 in line 3.

The excess alkanol removes most of the water present as a gaseous overhead stream 4. This is then fed to an alkanol recovery distillation column 5 where the water and alkanol are separated. Reflux is returned to the distillation column 5 in line 9 and lights are purged in line 8. Alkanol is removed in line 6 and returned to the esterification reactor 2. Fresh alkanol is added in line 7.

Waste water is removed in line 10. This waste water stream will always also contain some or all of residual alkanol, alkyl ester and fatty acid. The bulk of the fatty acid and methyl esters can be recovered in a simple separation as they are immiscible with water. However, even after this separation, the water stream will still contain residual organic content that requires the stream to be treated by a waste effluent treatment unit.

This process does suffer from various disadvantages and drawbacks. First, useful feedstocks and products such as alkanol, fatty acids and esters are lost to the process thereby reducing the economics of the system. However, the main problem is that water treatment processes are required to reduce the chemical oxygen demand (COD) of the effluent stream.

COD is commonly used to indirectly measure the amount of organic compounds in water. The basis for the COD test is that nearly all organic compounds can be fully oxidized to carbon dioxide with a strong oxidizing agent under acidic conditions. The International Organization for Standardization describes a standard method for measuring COD in ISO 6060. Many governments impose regulations regarding the maximum COD allowed in wastewater before it can be returned to the environment. As environmental concerns increase, the requirement to reduce the COD further makes treatment plants for effluent streams increasingly costly to construct and operate.

The growth in demand for naturally derived detergent range alcohols such as that derived from coconut or palm kernel has driven a desire to provide an improved process for manufacturing the alcohols and for handling the effluents produced.

The problem associated with the prior art process such as that illustrated in FIG. 1 has been solved by the surprising finding that when the wastewater stream is subjected to a second distillation step, the heavy fatty acid and alkyl ester components are removed as part of the overhead stream giving a waste water stream having a lower COD.

Thus according to the present invention there is provided a process for the production of fatty acid esters comprising:
(a) subjecting a fatty acid or fatty acid mixture to esterification with a lower alkanol in an esterification reactor maintained under esterification conditions to form a stream comprising the corresponding lower alkyl ester or esters and recovering same;

(b) recovering an overhead stream from the esterification reactor comprising unreacted lower alkanol, water, and a heavy organic content comprising one or more of lower alkyl ester and/or acids;

(c) subjecting the recovered overhead stream to distillation in a first distillation column operating under first distillation conditions to separate a portion of the lower alkanol from a stream comprising the water, the remaining lower alkanol and the heavy organic content;

(d) recovering the stream comprising the water, the remaining lower alkanol and the heavy organic content; and (e) subjecting the stream comprising the water, the remaining lower alkanol and the heavy organic content to distillation in a second distillation column operating under second distillation conditions to provide an overhead stream comprising lower alkanol and at least a major portion of the heavy organic content and a water stream having a reduced heavy organic and alkanol content.

Without wishing to be bound by any theory it is believed that an azeotrope may be formed between the alkanol and the heavy organic content in the second distillation zone thereby allowing at least a major portion of the heavy organic content to be separated from the water. This is surprising in view of the high boiling points of the components of the heavy organic content.

The presence of the second distillation column and the separation that occurs therein, provides various advantages. One benefit is that there is an optimal recovery of alkanol. Another benefit is the greater recovery of fatty material. More importantly the removal of the COD value from the waste water effluent is optimised.

The waste water recovered may be of sufficient purity to enable the water to be recycled. Where the process of the present invention is carried out on the same site where the raw oil or fat is split, some or all of the waste water may be recycled to the reactor in which the splitting occurs.

The term "lower alkyl" means $C_1$- to $C_4$-alkyl, including methyl, ethyl, n-propyl, iso-propyl, n-butyl, iso-butyl and sec-butyl. The preferred lower alkyl radical is methyl. Similarly the term "lower alkanol" means $C_1$- to $C_4$-alkanols, including methanol, ethanol, n-propanol, iso-propanol, n-butanol, iso-butanol, and sec-butanol. Methanol is the preferred lower alkanol.

The term "fatty acids" means linear saturated, unsaturated or polyunsaturated aliphatic acids, such as linear alkyl, alkenyl, or hydroxyalkenyl carboxylic acids containing from about 6 to about 26 carbon atoms, preferably about 10 to about 20 carbon atoms. Examples of such fatty acids are decanoic acid (capric acid), dodecanoic acid (lauric acid), tetradecanoic acid (myristic acid), pentadecanoic acid, hexadecanoic acid (palmitic acid), heptadecanoic acid (margaric acid), octadecanoic acid (stearic acid or isostearic acid), octadecenoic acids (oleic acid, linoleic acid or linolenic acid), hydroxyoctadecenoic acid (ricinoleic acid), eicosanoic acid (arachidic acid) and docosanoic acid (behenic acid). Mixtures of fatty acids are of especial importance as raw materials from which the lower alkyl fatty acid esters used as starting material in the hydrogenation step are prepared. Such mixtures of acids can be obtained by hydrolysis of naturally occurring triglycerides such as coconut oil, rape seed oil, palm oils, tallow, lard and fish oils. If desired, such mixtures of acids can be subjected to distillation to remove lower boiling acids having a lower boiling point than a chosen temperature and thus produce a "topped" mixture of acids, or to remove higher boiling acids having a boiling point higher than a second chosen temperature and thus produce a "tailed" mixture of acids, or to remove both lower and higher boiling acids and thus produce a "topped and tailed" mixture of acids.

In a preferred process of the present invention esterification of the fatty acid or fatty acid mixture with the lower alkanol (e.g. methanol) is effected by a procedure in which the fatty acid or fatty acid mixture and lower alkanol are passed in countercurrent flow through a column reactor provided with a plurality of esterification trays mounted one above another, each adapted to hold a predetermined liquid volume and a charge of solid esterification catalyst thereon, liquid downcomer means associated with each esterification tray adapted to allow liquid phase to pass down the column reactor from that esterification tray but to retain solid esterification catalyst thereon, and vapour upcomer means associated with each esterification tray adapted to allow vapour to enter that esterification tray from below and to agitate the mixture of liquid and solid esterification catalyst on that tray, in which the fatty acid or fatty acid mixture is supplied in liquid phase to the uppermost one of said plurality of esterification trays whilst the lower alkanol is supplied in vapour form beneath the lowermost one of said plurality of esterification trays, in which vapour comprising lower alkanol and water of esterification is recovered from an upper part of the column reactor, and in which a lower alkyl fatty acid ester or ester mixture is recovered from a lower part of the column reactor.

In such a procedure the water content of the lower alkanol vapour supplied to the column reactor should be less than about 5 mole % and the number of esterification trays and the reaction conditions should be selected so that the stream of lower alkyl fatty acid ester or esters has a low acid content of less than about 1 mole %, calculated on a lower alkanol free basis, and an ester content, also expressed on an alkanol free basis, of at least about 99 mole %.

Any suitable reaction conditions can be used for the esterification in the esterification zone. The esterification conditions used in the column reactor will normally include use of elevated temperatures up to about 160° C., for example a temperature in the range of from about 80° C. to about 140° C., preferably in the range of from about 100° C. to about 125° C. Such operating temperatures will be determined by factors such as the thermal stability of the esterification catalyst, the kinetics of the esterification reaction and the vapour temperature of the lower alkanol fed to the base of the column reactor at the relevant inlet pressure. Typical operating pressures at the vapour inlet of the column reactor range from about 0.1 bara to about 25 bara. A liquid hourly space velocity through the column reactor in the range of from about $0.1\ hr^{-1}$ to about $10\ hr^{-1}$, typically from about $0.2\ hr^{-1}$ to about $2\ hr^{-1}$, may be used.

The column reactor has a plurality of esterification trays. Although two or three trays may suffice in some cases, it will typically be necessary to provide at least about 5 up to about 20 or more esterification trays in the column reactor. Typically each esterification tray is designed to provide a residence time for liquid on each tray of from about 1 minute up to about 120 minutes, preferably from about 5 minutes to about 60 minutes.

The fatty acid or fatty acid mixture is supplied in liquid form to an upper part of the column reactor or in admixture with lower alkanol, in solution in recycled ester product, or in solution in an inert solvent or diluent therefor. It is possible to pre-react the lower alkanol and the fatty acid or fatty acid mixture prior to introduction to the column reactor. The resulting reaction mixture contains a mixture of lower alkyl fatty acid ester or ester mixture, water, and lower alkanol.

The solid esterification catalyst may be a granular ion exchange resin containing $SO_3H$ and/or COOH groups. Macroreticular resins of this type are preferred. Examples of suitable resins are those sold under the trade marks "Amberlyst", "Dowex", "Dow" and "Purolite", such as Amberlyst 13, Amberlyst 66, Dow C351 and Purolite C150.

Different solid esterification catalysts may be used on different trays of the column reactor. Moreover different concentrations of solid esterification catalyst can be used on different trays.

The charge of solid particulate or granular esterification catalyst on each tray is typically sufficient to provide a catalyst liquid ratio on that tray corresponding to a resin concentration of at least about 0.2% w/v for example, a resin concentration in the range of from about 2% w/v to about 20% w/v, preferably 5% w/v to 10% w/v, calculated as dry resin. Sufficient catalyst should be used to enable equilibrium or near equilibrium conditions to be established on the tray within the selected residence time at the relevant operating conditions. On the other hand not so much catalyst should be used on each tray that it becomes difficult to maintain the catalyst in suspension in the liquid on the tray by the agitation produced by the upflowing vapour entering the tray from below. For a typical resin catalyst a resin concentration in the range of from about 2% v/v to about 20% v/v, preferably 5% v/v to 10% v/v may be used.

The particle size of the catalyst should be large enough to facilitate retention of the catalyst on each tray by means of a screen or similar device. However, as larger catalyst particle sizes are more difficult to maintain in suspension and have lower geometrical surface area per gram, it is expedient to use not too large a catalyst particle size. A suitable catalyst particle size is in the range of from about 0.1 mm to about 5 mm.

In an alternative arrangement, the reaction may be autocatalysed.

One or more wash trays may be provided above the esterification trays in order to prevent loss of product, solvent and/or reagents from the column reactor.

The process of the invention utilises the vaporous stream of the lower alkanol to carry away water of esterification produced in the esterification reactor but without carrying with it significant quantities of the fatty acid or acids or of the lower alkyl fatty acid ester or esters. The carryover of fatty acid or acids or of the lower alkyl fatty acid ester or esters may be greater with a shorter alkyl chain length of the fatty acid or acids. The overhead stream may include lower alkanol dialkyl ether. In general the overhead stream recovered from the esterification will include: from about 5 to about 40 wt % water, preferably from about 15 to about 30 wt %; from about 50 to about 90 wt % alkanol, preferably from about 60 to about 85 wt % alkanol, from about 0.5 to about 20 wt % dialkyl ether, preferably from about 1 to about 10 wt % dialkyl ether; from about 0.01 wt % to about 1 wt % of fatty acid; and from about 0.01 wt % to about 1 wt % of fatty ester.

The overhead stream is passed to a first distillation column where a portion of the alkanol is separated. The separated alkanol portion is preferably recycled to the esterification reactor. The lower the water content of the lower alkanol vapour that is supplied to the esterification column, the further towards 100% conversion to ester the esterification equilibrium reaction can be driven and the lower the residual acidity of the ester containing product recovered from the bottom of the column reactor will be. However, a balance may often have to be struck between the cost of providing, for example, a substantially dry lower alkanol for vaporisation into the column reactor, on the one hand, and the cost of providing and operating any additional downstream processing facilities that may be required to upgrade the ester product to the required quality if a less dry alkanol is used. This will vary from lower alkanol to lower alkanol and will depend upon the interaction between water and lower alkanol (e.g. azeotrope formation) and its effect upon alkanol/water separation. As discussed above, where an alkanol/water azeotrope is present it may be necessary to provide an additional column to split the azeotrope by the use of, for example, pressure swing distillation or a membrane system in order to attain an alkanol stream of suitable dryness. In any case, the water content of the lower alkanol vapour supplied to the reactor is less than about 5 mole %, and even more preferably is less than about 1 mole %.

The first distillation column may be of any suitable configuration. In one arrangement the distillation column will operate at a pressure of from about 0.1 to about 5 bara. The top temperature may be in the region of about 40° to about 110° C. and may be about 70 to about 80° C. The reboiler temperature may be in the region of about 80° to about 150° C. and may be about 110 to about 120° C. In one arrangement the distillation column may be fabricated from stainless steel. It will generally have a plurality of trays or a structured packing. A shell and tube condenser may be used for the overheads. The overhead stream will comprise non-condensable dialkylether, nitrogen and lower alkanol.

Generally the amount of lower alkanol separated in the first distillation column for recycle to the esterification reaction will be in the region of about 95 wt % to about 99.8 wt %.

The lower alkanol may be taken from any suitable point in the first distillation column.

In one arrangement, it may be taken as a side draw.

The column will generally include a reflux. A purge of lights, which may be mostly dialkyl ether, may also be taken.

A stream will be recovered from at or towards the bottom of the first distillation column. This stream will contain water, the remaining lower alkanol and the heavy organic content. The amount of lower alkanol present in this stream will depend on the amount of lower alkanol removed for return to the esterification zone.

Where a lower alkanol/water azeotrope is present, the stream may be subjected to a process to break the azeotrope. This process may be the application of pressure swing distillation or by application of membrane to remove any residual water.

This stream can then be passed to the second distillation column. The second distillation column may be of any suitable configuration. It may be of the same or different configuration to the first distillation column.

In one arrangement, the second distillation column may be operated to have a top temperature of about 40° C. to about 110° C. and may be about 60° C. to about 100° C. and a reboiler temperature of about 80° C. to about 150° C. and may be about 90° C. to about 120° C.

The first and second distillation columns will generally be separate columns. However, it is possible that these may be configured as separate zones in the same shell.

The lower alkanol and heavy organic content separated from the water will be removed from the second distillation column in the overhead stream. The water will be removed from the bottom of the second distillation column. The overhead stream may be returned to the esterification reactor.

It will be understood that it is desirable that the amount of alkanol and heavy content be reduced as much as possible however, the water received may still contain some alkanol and/or heavy organic content. Thus the reference to the water having a reduced heavy organic content means that the water stream contains less alkanol and/or heavy organic content than the stream entering the second distillation column. In one arrangement it will be reduced from about 0.55 wt % total organics to about 0.06 wt % or less.

It will be understood that references to an overhead stream means a stream taken from the top of the column or from an upper area thereof. Similarly the reference to a stream being taken from the bottom of the column means a stream taken from the base of the column or from a lower area thereof.

Steam may be supplied to the second distillation column to strip the alkanol and fatty components. This can be freshly added stream or stream generated from within the process.

The water stream having the reduced heavy organic and alkanol may be recycled to a fat splitting section.

The present invention will now be described by way of example with reference to the accompanying figures in which.

It will be understood by those skilled in the art that the drawings are diagrammatic and that further items of equipment such as reflux drums, pumps, vacuum pumps, temperature sensors, pressure sensors, pressure relief valves, control valves, flow controllers, level controllers, holding tanks, storage tanks, and the like may be required in a commercial plant. The provision of such ancillary items of equipment forms no part of the present invention and is in accordance with conventional chemical engineering practice.

Figure 1:
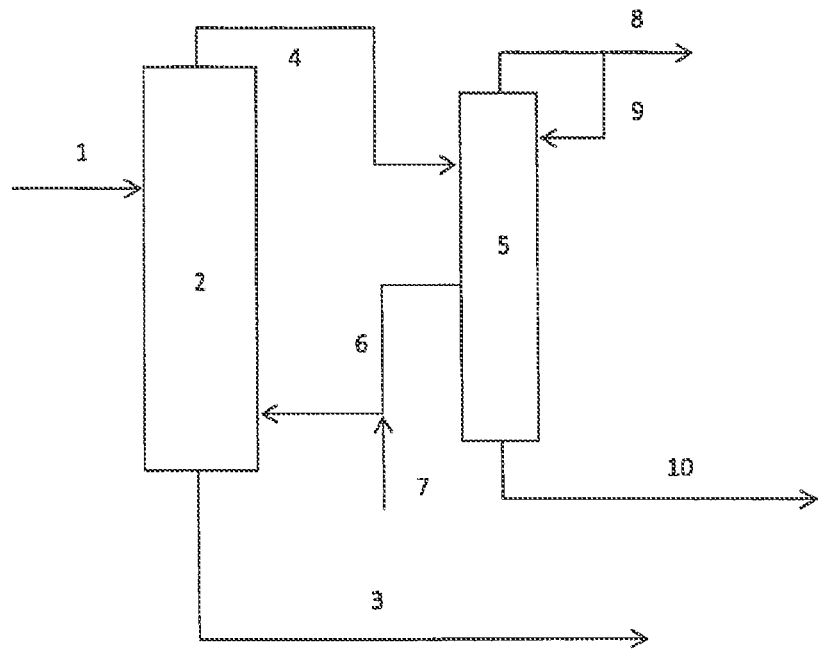
FIG. 1 is a schematic representation of a process according to the prior art.
Figure 2:
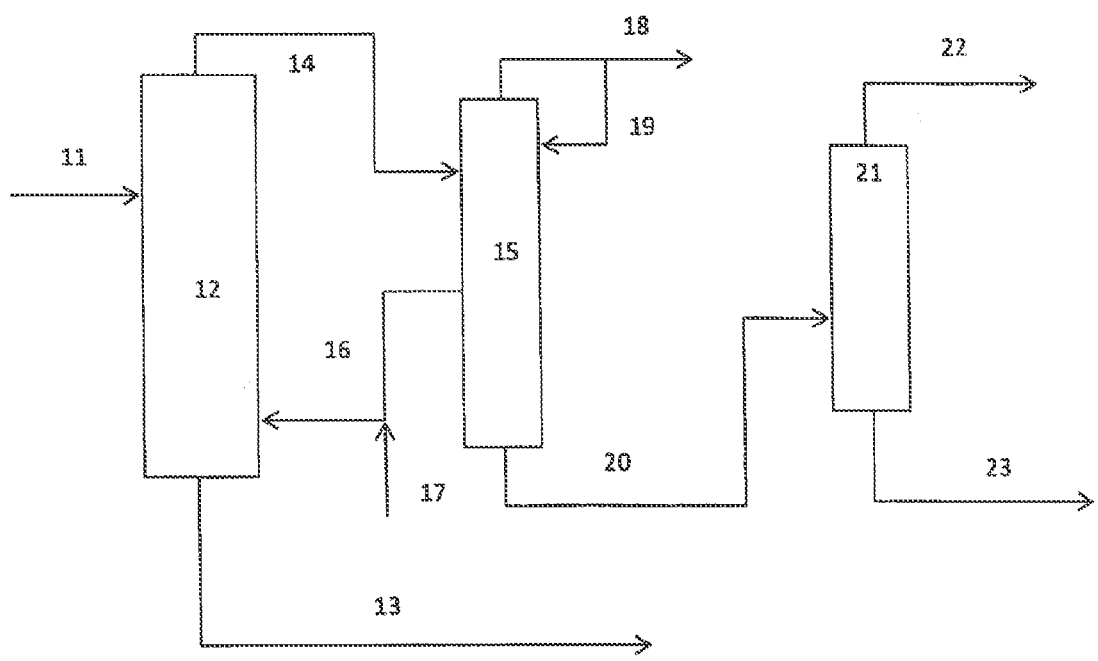
FIG. 2 is a schematic representation of the process of the present invention.

A simplified version of a flow scheme of the present invention is illustrated schematically in FIG. 2. A fatty acid or mixture of fatty acid is supplied in line 11 before being subjected to esterification in the reactor 12. The acid is reacted with upflowing alkanol added to the esterification reacts in lines 16 and 17. The product of the esterification reaction is withdrawn in line 13. The product of the esterification may be subjected to any subsequent treatment, polishing and the like.

The excess alkanol removes most of the water present as a gaseous overhead stream 14. This is then fed to a first distillation column 15 where a proportion of the alkanol is separated and removed from the first distillation column 15 in line 16 and returned to the esterification reactor 12. Fresh alkanol is added in line 17. Reflux from the top of the first distillation column 15 is returned in line 19 and lights are purged in line 18.

The water stream, which comprises water, remaining alkanol and the heavy organic content is removed from the bottom of the first distillation column 15 and passed in line 20 to the second distillation column 21. In this column at least a major portion of the remaining alkanol and heavy organic content is removed as overheads in line 22 and the water, which has a reduced content of alkanol and heavy organics, is removed in line 23. In an alternative arrangement, the alkanol and heavy organic content removed as overheads in line 22 may be returned to the esterification reactor 12.

Figure 3:
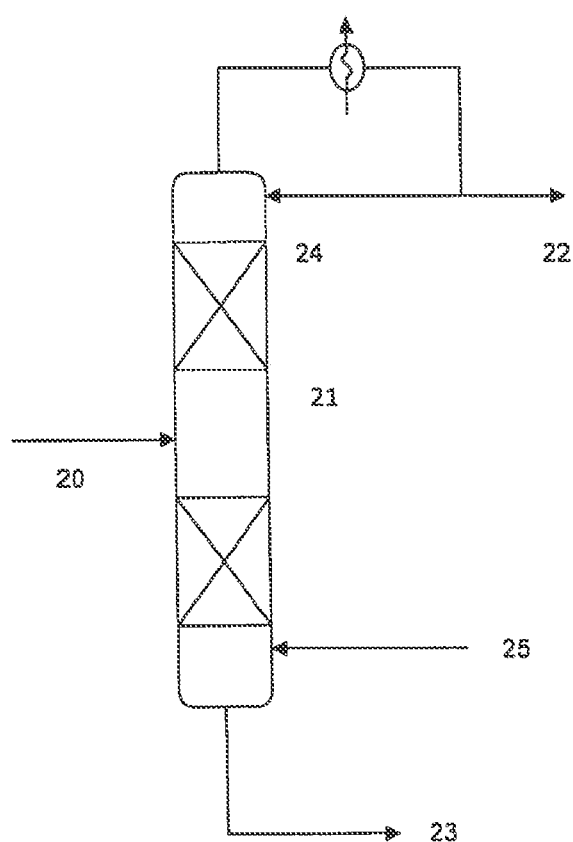
FIG. 3 is a schematic representation of the process in a second distillation column in which stream stripping is used.

An alternative arrangement for the second distillation column 21 is illustrated in FIG. 3, The bottom stream from the first distillation column is fed to the second distillation column 21 via line 20. Steam is added in line 25 to assist the stripping of the remaining alkanol and heavy organic content which leaves the second distillation column in line 22. A reflux system 24 will generally be located at the top of the column 21. The water having a reduce content of alkanol and heavy organics is removed in line 23.

The present invention will now be described with reference to the following examples.

EXAMPLE 1

The experiment was carried out using a laboratory scale 1 inch glass distillation column. The feed point was located in the middle of the column with four pieces of structured packing located above and below. A three litre three necked round bottomed flask heated via an isomantle was used as the reboiler, with the temperature of the isomantle controlled by the skin temperature of the flask. Two thermocouples were attached to the top and bottom surface sections of the column and the column was insulated to minimise any heat losses. A vapour travelling up the column was condensed and then collected as a liquid in the reflux drum. Off take and reflux return rates were then adjusted to maintain a liquid level.

2013 g of a feed comprising 96.85 wt % water, 3.00 wt % methanol, 0.10 wt & methyl laurate and 0.05 wt % lauric acid was charged to the round bottomed flask and then heated to 100° C. to generate vapour traffic. The reflux back to the column was set at approximately ten times that of the overheads take off. Ten overhead fractions ranging between 20 and 25 g were taken.

The results are set out in Table 1.

TABLE 1

| | Temperatures (° C.) | | | Reflux Ratio | | Analysis (wt %) | | | Acid by |
| | | | | | | | C12 | | |
| Time | Skin | Pot | OH's | Ratio | Comments | MeOH | Ester | Water | Titre |
| 0 | 199 | 97 | 63 | 10.0 | Starting to take off | | | | |
| 25 | 195 | 98 | 63 | 12.0 | Fraction 1 | 96.584 | 0.087 | 3.329 | |
| 130 | 195 | 100 | 63 | 10.0 | Fraction 2 | 99.970 | | 0.030 | 0.061 |
| 230 | 195 | 100 | 64 | 10.0 | Fraction 3 | 99.977 | | 0.023 | 0.064 |
| 420 | 195 | 100 | 96 | 8.0 | Fraction 4 | 62.740 | 0.271 | 36.974 | 0.036 |
| 455 | 200 | 100 | 99 | 9.0 | Fraction 5 | 15.584 | 0.021 | 84.395 | |
| 550 | 200 | 100 | 99 | 9.0 | Fraction 6 | 3.175 | 0.006 | 96.819 | |
| 715 | 200 | 99 | 99 | 11.0 | Fraction 7 | 0.530 | 0.019 | 99.451 | |
| 815 | 200 | 99 | 99 | 11.0 | Fraction 8 | 0.231 | 0.046 | 99.723 | |
| 935 | 200 | 99 | 99 | 10.0 | Fraction 9 | 0.228 | 0.009 | 99.762 | |
| 1055 | 200 | 99 | 99 | 10.0 | Fraction 10 | 0.172 | 0.021 | 99.807 | |

EXAMPLE 2

Example 1 was repeated, but pot samples were also removed. The final pot sample was also analysed for chemical oxygen demand (COD).

For the methanol water test work the overheads stream was analysed for water using a Karl Fischer Coulometric Analyser. The methanol content in the bottoms stream was determined by Gas Chromatography (GC), using flame ionisation detection and a constant injection volume. For the methanol, methyl laurate and water test work all streams were analysed by GC for methanol and methyl laurate and also by titration for lauric acid using 0.01 molar potassium hydroxide solution and phenolphthalein indicator.

The results are set out in Table 2.

TABLE 2

| | Temperatures (° C.) | | | Reflux Ratio | | Overheads Analysis (wt %) | | | |
|---|---|---|---|---|---|---|---|---|---|
| | | | | | | | C12 | | Acid by |
| Time | Skin | Pot | OH's | Ratio | Comments | MeOH | Ester | Water | Titre |
| 0 | 200 | 98 | 63 | 10.0 | Starting to take off | | | | |
| 40 | 200 | 98 | 63 | 10.0 | Fraction 1 | 89.701 | 1.532 | 7.956 | 2.312 |
| 90 | 200 | 99 | 66 | 10.0 | Fraction 2 | 99.617 | 0.050 | 0.233 | 0.100 |
| 195 | 200 | 99 | 96 | 10.0 | Fraction 3 | 51.926 | 0.154 | 47.852 | 0.000 |
| 260 | 200 | 100 | 98 | 12.0 | Fraction 4 | 7.864 | 0.014 | 92.063 | 0.000 |
| 345 | 200 | 100 | 99 | 9.0 | Fraction 5 | 1.925 | 0.001 | 98.050 | |
| 400 | 200 | 100 | 99 | 10.0 | Fraction 6 | 0.404 | 0.000 | 99.596 | |
| 465 | 200 | 100 | 99 | 14.0 | Fraction 7 | 0.637 | 0.011 | 99.351 | |
| 540 | 200 | 100 | 99 | 11.0 | Fraction 8 | 0.313 | 0.019 | 99.570 | |
| 610 | 200 | 100 | 99 | 9.0 | Fraction 9 | 0.014 | | 99.986 | |
| 750 | 200 | 100 | 99 | 9.0 | Fraction 10 | 0.006 | | 99.994 | |

| Time | Pot Analysis (wt %) | | |
|---|---|---|---|
| 0 | MeOH | C12 Ester | Water |
| 40 | 1.736 | 0.007 | 98.24 |
| 90 | 0.893 | | 99.08 |
| 195 | 0.07 | 0.003 | 99.91 |
| 260 | 0.011 | | 99.99 |
| 345 | 0.001 | | 100 |
| 400 | | | 99.99 |
| 465 | | | 99.98 |
| 540 | | | 100 |
| 610 | | | 99.99 |
| 750 | | | 100 |
| COD of final pot contents | | 13 | mgL-1 O2 |

EXAMPLE 3

A COD model was used to predict the reduction of cod values for the present invention. The results are illustrated in Table 3.

TABLE 3

| Decanter feed composition: | | | Feed | molsO2/mol feed | O2 req. | mol |
|---|---|---|---|---|---|---|
| | wt % | | kmol/h | | kmol/h | wt |
| MeOH | 0.025 | CH3OH | 0.0088 | 1.5 | 0.0132 | 32.042 |
| C10 acid | 0.0125 | C10H20O2 | 0.0008 | 14 | 0.0114 | 172.27 |
| C12 acid | 0.205 | C12H24O2 | 0.0115 | 17 | 0.1961 | 200.324 |
| C14 acid | 0.025 | C14H28O2 | 0.0012 | 20 | 0.0247 | 228.37 |
| C16 acid | 0.005 | C16H32O2 | 0.0002 | 23 | 0.0051 | 256.43 |
| C18 acid | 0.0025 | C18H36O2 | 0.0001 | 26 | 0.0026 | 284.48 |
| C10 ester | 0.0125 | C11H22O2 | 0.0008 | 15.5 | 0.0117 | 186.297 |
| C12 ester | 0.205 | C13H26O2 | 0.0108 | 18.5 | 0.1994 | 214.351 |
| C14 ester | 0.025 | C15H30O2 | 0.0012 | 21.5 | 0.0250 | 242.405 |
| C16 ester | 0.005 | C17H34O2 | 0.0002 | 24.5 | 0.0051 | 270.459 |
| C18 ester | 0.0025 | C19H38O2 | 0.0001 | 27.5 | 0.0026 | 298.514 |
| water | 99.475 | H2O | 62.2271 | | | 18.016 |
| | | | | | 0.4968 | |

| Mass flow = | 1127 | kg/h |
|---|---|---|
| Density = | 950 | kg/m3 |
| Vol flow = | 1.18632 | m3/h |
| | 1186.32 | l/h |

TABLE 3-continued

| | | | | | | |
|---|---|---|---|---|---|---|
| Total O2 required = | | | 0.4968 | | kmol/h | |
| | | | 15.8981 | | kg/h | |
| COD = | | | 13401.2 | | mg/l | |

| Assumed Decanter water product composition | | | | mol | | mol |
|---|---|---|---|---|---|---|
| | wt % | | kmol/h | feed | kmol/h | wt |
| MeOH | 0.025 | CH3OH | 0.0088 | 1.5 | 0.0132 | 32.042 |
| C10 acid | 0.0125 | C10H20O2 | 0.0008 | 14 | 0.0114 | 172.27 |
| C12 acid | 0.03 | C12H24O2 | 0.0017 | 17 | 0.0287 | 200.324 |
| C14 acid | 0 | C14H28O2 | 0.0000 | 20 | 0.0000 | 228.37 |
| C16 acid | 0 | C16H32O2 | 0.0000 | 23 | 0.0000 | 256.43 |
| C18 acid | 0 | C18H36O2 | 0.0000 | 26 | 0.0000 | 284.48 |
| C10 ester | 0.0125 | C11H22O2 | 0.0008 | 15.5 | 0.0117 | 186.297 |
| C12 ester | 0.03 | C13H26O2 | 0.0016 | 18.5 | 0.0292 | 214.351 |
| C14 ester | 0 | C15H30O2 | 0.0000 | 21.5 | 0.0000 | 242.405 |
| C16 ester | 0 | C17H34O2 | 0.0000 | 24.5 | 0.0000 | 270.459 |
| C18 ester | 0 | C19H38O2 | 0.0000 | 27.5 | 0.0000 | 298.514 |
| water | 99.89 | H2O | 62.4867 | | | 18.016 |
| | | | | | 0.0942 | |

| | | | | | | |
|---|---|---|---|---|---|---|
| Total O2 required = | | | 0.0942 | | kmol/h | |
| | | | 3.01541 | | kg/h | |
| COD = | | | 2541.83 | | mg/l | |

The following Table 4 compared the measured results with the predicted results confirming that the prediction is reasonable.

TABLE 4

| % MeOH Measured analytically | Measured COD | Predicted COD (MeOH only) | Predicted COD (MeOH + 0.03%C12 Acid + 0.12% C12 Ester) |
|---|---|---|---|
| 0.02 | 4150 | 285 | 4207 |
| 1.09 | 23300 | 15512 | 19435 |
| 1.02 | 11490 | 14516 | 18438 |
| 0.35 | 13680 | 4981 | 8903 |
| 0.72 | 16900 | 10247 | 14169 |
| 2.17 | 34800 | 30882 | 34804 |

It can be seen from the above examples that the overhead include high boiling $C_{12}$ ester which has a boiling point of 261° C. and $C_{12}$ acid which has a boiling point of 299° C. even though the pot temperature in the batch distillation does not go above 100° C. Thus, as distillation proceeds, not only is the alkanol removed but the organic levels are reduced to low COD values which are acceptable in wastewater.

The following Tables 5 to 8 exemplify the use of alkanols other than methanol and show the removal of a partial of the heavy organics as well as the alkanol from the water.

TABLE 5

Summary of ethanol, water, ethyl laurate and lauric acid distillation

| Fraction | Overheads temperature /° C. | Overheads mass /g | Analysis/wt % | | | |
|---|---|---|---|---|---|---|
| | | | EtOH | Ethyl Laurate | Lauric Acid | Water |
| Overheads | | | | | | |
| 1 | 79 | 26.6 | 56.537 | | 0.149 | 38.813 |
| 2 | 95 | 21.54 | 61.953 | | 0.110 | 36.809 |
| 3 | 96 | 28.55 | 44.145 | 0.230 | 0.103 | 53.538 |
| 4 | 97 | 24.95 | 10.645 | | 0.091 | 88.984 |
| 5 | 97 | 33.72 | 0.857 | | 0.077 | 98.697 |
| 6 | 97 | 37.75 | 0.209 | | 0.123 | 97.889 |
| 7 | 97 | 20.19 | 0.093 | | 0.084 | 99.705 |
| 8 | 97 | 127.96 | 0.038 | | 0.073 | 99.351 |
| 9 | 97 | 120.71 | | | 0.070 | 99.831 |
| 10 | 97 | 72 | | | 0.072 | 99.680 |
| 11 | 97 | 50.45 | | | 0.063 | 99.800 |
| Pot sample | | | | | | |
| Feed | | | 3.020 | 0.100 | 0.050 | 96.830 |

TABLE 6

Summary of ethanol, water, ethyl palmitate and palmitic acid distillation

| Fraction | Overheads temperature /° C. | Overheads mass /g | Analysis/wt % | | | |
|---|---|---|---|---|---|---|
| | | | EtOH | Ethyl Palmitate | Palmitic Acid | Water |
| Overheads | | | | | | |
| 1 | 75 | 34.76 | 57.960 | | 0.223 | 40.057 |
| 2 | 95 | 24.99 | 53.940 | | 0.020 | 45.592 |
| 3 | 96 | 17.45 | 42.086 | | 0.017 | 57.182 |
| 4 | 97 | 33.58 | 6.276 | | 0.009 | 93.615 |
| 5 | 97 | 58.91 | 0.323 | | 0.024 | 99.588 |
| 6 | 97 | 34.21 | 0.137 | | | 99.823 |
| 7 | 97 | 124.2 | 0.048 | | | 99.918 |
| 8 | 97 | 58.4 | 0.022 | | | 99.936 |
| 8 | 97 | 45.7 | 0.013 | | | 99.942 |
| 10 | 97 | 26.2 | 0.012 | | | 99.945 |
| Pot sample | | | | | | |
| Feed | | | 3.000 | 0.120 | 0.050 | 96.830 |

TABLE 7

Summary of butanol, water, butyl laurate and lauric acid distillation

| Fraction | Overheads temperature /° C. | Overheads mass /g | Analysis/wt % | | | |
|---|---|---|---|---|---|---|
| | | | 1-BuOH | Butyl Laurate | Lauric Acid | Water |
| Overheads | | | | | | |
| 1 - top layer | 90 | 41.08 | 62.877 | | 0.384 | 35.889 |
| 1 - bottom layer | | | 7.563 | | 0.016 | 92.221 |
| 2 - top layer | 90 | 15.29 | 62.868 | | 0.025 | 36.997 |
| 2 - bottom layer | | | 6.906 | | 0.008 | 93.017 |
| 3 - top layer | 89 | 20.36 | 64.748 | | 0.025 | 35.153 |
| 3 - bottom layer | | | 6.915 | | 0.005 | 93.033 |
| 4 - top layer | 97 | 21.49 | 62.331 | 0.128 | 0.020 | 36.657 |
| 4 - bottom layer | | | 6.477 | | 0.006 | 93.490 |
| 5 | 97 | 23.49 | 1.437 | | 0.017 | 98.504 |
| 6 | 97 | 64.5 | 0.112 | | | 99.874 |
| 7 | 97 | 120.5 | 0.039 | | | 99.950 |
| 8 | 97 | 83.4 | 0.016 | 0.015 | | 99.958 |
| 9 | 97 | 44.5 | 0.009 | 0.139 | | 99.653 |
| 10 | 97 | 37.67 | 0.009 | 0.335 | | 99.584 |
| 11 | 97 | 68.1 | 0.009 | 0.006 | | 99.968 |
| 12 | 97 | 40.5 | 0.011 | 0.006 | | 99.953 |
| Pot Sample | | | | | | |
| Feed | | | 3.000 | 0.100 | 0.050 | 96.840 |

TABLE 8

Summary of propanol, water, propyl palmitate and palmitic acid distillation

| Fraction | Overheads temperature /° C. | Overheads mass /g | Analysis/wt % | | | |
|---|---|---|---|---|---|---|
| | | | 1-Propanol | Propyl Palmitate | Palmitic Acid | Water |
| Overheads | | | | | | |
| 1 | 84 | 16.04 | 58.347 | 0.032 | 0.490 | 38.618 |
| 2 | 84 | 15.56 | 71.245 | 0.013 | 0.087 | 28.122 |
| 3 | 84 | 22.56 | 73.576 | 0.006 | | 26.255 |
| 4 | 84 | 20.56 | 67.009 | | | 32.932 |
| 5 | 96 | 17.89 | 71.396 | | 0.041 | 27.889 |
| 6 | 96 | 37.33 | 2.295 | | 0.037 | 97.624 |

TABLE 8-continued

Summary of propanol, water, propyl palmitate and palmitic acid distillation

| Fraction | Overheads temperature /° C. | Overheads mass /g | Analysis/wt % | | | |
|---|---|---|---|---|---|---|
| | | | 1-Propanol | Propyl Palmitate | Palmitic Acid | Water |
| 7 | 96 | 74.61 | 0.183 | | 0.033 | 99.784 |
| 8 | 97 | 24.86 | 0.112 | | 0.043 | 99.845 |
| 9 | 97 | 57.97 | 0.066 | 0.232 | 0.090 | 98.391 |
| 10 | 97 | 41.4 | 0.037 | | 0.033 | 99.896 |
| 11 | 96 | 239.8 | 0.066 | 0.113 | 0.018 | 99.433 |
| 12 | 96 | 58.6 | 0.016 | | 0.010 | 99.956 |
| 13 | 96 | 36.07 | 0.015 | 0.006 | 0.016 | 99.931 |
| 14 Pot Sample | 96 | 28.1 | 0.017 | 0.005 | 0.017 | 99.926 |
| Feed | | | 2.96 | 1.830 | 0.700 | 94.510 |

The invention claimed is:

1. A process for the production of fatty acid esters comprising:
   (a) subjecting a fatty acid or fatty acid mixture to esterification with a lower alkanol in an esterification reactor maintained under esterification conditions to form a stream comprising the corresponding lower alkyl ester or esters and recovering same;
   (b) recovering an overhead stream from the esterification reactor comprising unreacted lower alkanol, water, and a heavy organic content comprising one or more of lower alkyl ester and/or acids;
   (c) subjecting the recovered overhead stream to distillation in a first distillation column operating under first distillation conditions to separate a portion of the lower alkanol from a stream comprising the water, the remaining lower alkanol and the heavy organic content;
   (d) recovering the stream comprising the water, the remaining lower alkanol and the heavy organic content; and
   (e) subjecting the stream comprising the water, the remaining lower alkanol and the heavy organic content to distillation in a second distillation column operating under second distillation conditions to provide an overhead stream comprising lower alkanol and at least a major portion of the heavy organic content and a water stream having a reduced heavy organic and alkanol content.

2. A process according to claim 1 wherein the esterification of the fatty acid or fatty acid mixture with the lower alkanol is effected in a column reactor in which the fatty acid or fatty acid mixture and lower alkanol are passed in countercurrent flow.

3. A process according to claim 1 wherein the water content of the lower alkanol supplied in the esterification reaction is less than about 5 mole % and the reaction conditions are selected so that the stream of lower alkyl fatty acid ester or esters has a low acid content of less than about 1 mole %, calculated on a lower alkanol free basis, and an ester content, also expressed on an alkanol free basis, of at least about 99 mole %.

4. A process according to claim 1 wherein the esterification reaction is carried out in one of a temperature up to about 160° C., a temperature in the range of from about 80° C. to about 140° C., and a temperature of from about 100° C. to about 125° C.

5. A process according to claim 1 wherein the esterification reaction is carried out a pressure from about 0.1 bara to about 25 bara.

6. A process according to claim 1 wherein the esterification is carried out with a liquid hourly space velocity through the column reactor in one of a range of from about 0.1 $hr^{-1}$ to about 10 $hr^{-1}$, and a range of from about 0.2 $hr^{-1}$ to about 2 $hr^{-1}$.

7. A process according to claim 1 wherein the esterification is carried out in the presence of a solid esterification catalyst which is a granular ion exchange resin containing at least one of SO3H groups and COOH groups.

8. A process according to claim 1 wherein the esterification is autocatalysed.

9. A process according to claim 1 wherein the first distillation column is operated at a pressure of from about 0.1 bara to about 5 bara.

10. A process according to claim 1 wherein the first distillation column has a top temperature in the region of about 40 to about 110° C.

11. A process according to claim 1 wherein the first distillation column has a reboiler temperature in the region of about 80 to about 150° C.

12. A process according to claim 1 additionally comprising a step of breaking any lower alkanol/water azeotrope present after step (c).

13. A process according to claim 12 wherein the azeotrope is broken by the application of pressure swing distillation or a membrane to remove any residual water.

14. A process according to claim 1 wherein the second distillation column has a top temperature of from about 40° C. to about 110° C.

15. A process according to claim 1 wherein the second distillation column has a reboiler temperature of about 80° C. to about 150° C.

16. A process according to claim 1 wherein steam is added to the second distillation column.

17. A process according to claim 1 wherein the water stream having the reduced heavy organic and alkanol content is recycled to a fat splitting section.

* * * * *

UNITED STATES PATENT AND TRADEMARK OFFICE
CERTIFICATE OF CORRECTION

| | | |
|---|---|---|
| PATENT NO. | : 9,228,156 B2 | Page 1 of 1 |
| APPLICATION NO. | : 14/407862 | |
| DATED | : January 5, 2016 | |
| INVENTOR(S) | : Wild et al. | |

It is certified that error appears in the above-identified patent and that said Letters Patent is hereby corrected as shown below:

On the title page item (72), add -- Simon Nicholas Tilley, Thornaby, (GB) --

Signed and Sealed this
Nineteenth Day of July, 2016

Michelle K. Lee
*Director of the United States Patent and Trademark Office*